US006017608A

United States Patent [19]

Braun et al.

[11] Patent Number: 6,017,608

[45] Date of Patent: Jan. 25, 2000

[54] DECORATIVE SAFETY ATTACHMENTS FOR ENHANCING VISIBILITY OF SCREEN DOORS AND WINDOWS

[76] Inventors: John Richard Braun; Joyce Carol Braun, both of 6 Juxon Ct., Baltimore, Md. 21236-2624

[21] Appl. No.: 08/970,688

[22] Filed: Nov. 14, 1997

[51] Int. Cl.[7] .......... B32B 3/06

[52] U.S. Cl. .......... 428/99; 428/63; 428/131; 24/696

[58] Field of Search .......... 428/63, 99, 131; 24/696

[56] References Cited

U.S. PATENT DOCUMENTS

| | | |
|---|---|---|
| 697,106 | 4/1902 | Schofield . |
| 1,123,930 | 1/1915 | Ryan . |
| 1,345,211 | 6/1920 | Milnes . |
| 1,619,945 | 3/1927 | Leslie . |
| 1,764,398 | 6/1930 | Fitz Gerald . |
| 1,879,695 | 9/1932 | Leissner . |
| 2,122,155 | 6/1938 | Schlatt . |
| 2,487,830 | 11/1949 | Robbins, II . |
| 2,679,700 | 6/1954 | Urbain . |
| 3,261,393 | 7/1966 | Templeton . |
| 3,308,875 | 3/1967 | Abrams . |
| 4,163,817 | 8/1979 | Dicarlantonio et al. .......... 428/63 |
| 4,760,980 | 8/1988 | Sharpe . |
| 4,914,844 | 4/1990 | Seery . |
| 5,390,800 | 2/1995 | Tucker . |

*Primary Examiner*—Alexander Thomas
*Attorney, Agent, or Firm*—Law Offices of Royal W. Craig

[57] ABSTRACT

A decorative safety attachment for screen doors and windows for enhancing visibility and thereby preventing inadvertent walk-through, injury to persons or pets, tearing of the screen itself, or damage to other components or property. The attachment includes an array of attachment pins which can be conveniently inserted into and removed from an ordinary screen mesh.

18 Claims, 7 Drawing Sheets

DECORATIVE SAFETY ATTACHMENTS FOR ENHANCING VISIBILITY OF SCREEN DOORS AND WINDOWS

BACKGROUND OF THE INVENTION

1. Field of the Invention

The present invention relates to attachments for door and window screens and, more particularly, to improved decorative safety attachments for placement on ordinary door or window screening. The attachments improve the overall visibility of the screen and thereby prevent inadvertent walk-through and resultant injury to persons or pets, tearing of the screening itself, or damage to other components or property. The present invention also provides a decorative benefit and helps to conceal minor wear or tears in the screening.

2. Description of the Background

There are a number of commercially available kits for repairing door or window screening.

For example, U.S. Pat. No. 4,760,980 to Sharpe discloses a method and apparatus for repairing an opening in a screen having front and back patch members, whereby the members are placed over a screen opening and attached to one another via a hook-and-loop type fastening device on each of the two members.

U.S. Pat. No. 3,261,393 to Templeton discloses a method and apparatus for decoratively repairing holes in screens, whereby a threaded shaft is provided on a patch and inserted through the screen for attachment to a washer and thumb screw on the other side of the screen, thus holding the patch in place. Alternatively, two flattened surfaces each support an ornamental figure for placement over a hole in a screen, whereby each surface is provided with a snap attachment for connection to the other surface when placed on opposite sides of the damaged screen.

U.S. Pat. No. 2,487,830 to Robbins, II discloses a thermoplastic screen patch having ends which form a series of screen-engaging hooks which, when heated, contract to hold the patch in place.

There are also a number of products available for decorating door and window screening. For example, U.S. Pat. No. 3,308,875 to Abrams discloses a decorative panel configured on a flexible frame composed of piano wire or the like that is attached to a screen by flexing the frame. Extended frame members are inserted through the screen such that when the flexed screen is released, it returns to its original size and is held in place by the bearing of the extended frame members against the screen.

U.S. Pat. No. 1,764,398 to Fitz Gerald discloses an ornamental screening obtained by filling in portions of the screen mesh with a solidifying material to provide a decorative background or "web" on which the details of a design can be imposed.

Still there are other products which attempt to improve the visiblity of door and window screening for safety purposes. For example, SeeDoor Products, Inc. sells a decorative "Safety Signal" magnet set that attaches to each side of the screen mesh of a door or window.

Whether intended primarily for repairing screens, decorating screens, or improving the visibility of door and window screening for safety purposes, these and other like devices hold significant disadvantages, particularly as relating to their composition and means of anchoring to the screening itself. The Sharpe ('980), Templeton ('393), Robins II ('830), and SeeDoor devices for example all involve a two-sided screen anchoring method, requiring access to both sides of the screen for installation. The magnetic composition of the SeeDoor device also produces additional weight to bear on the screen. Accordingly, multiple attachments could cause minor screen sagging, particularly where vinyl coated glass yarn type screening is involved. Devices with two-sided screen anchoring methods may also pose clearance problems, particularly for sliding door applications where clearance on one side of the screen is usually minimal. The two-sided devices also require precise alignment of their respective components for attachment to a screen surface.

Several of the known devices also hold significant disadvantages in the methods by which the devices are attached to a screen. For example, the Robins II ('830) device requires the application of heat upon installation, both complicating the installation process and creating a hazardous condition for the installer. The Fitz Gerald ('398) device requires the use of complicated solvent materials which may prove messy and time consuming, and which produce a permanent (i.e., irreversible) change in the screening surface. Further, the Abrams ('875) device described above is relegated to large sizes and may involve undesirable material (i.e., wire) that may prove harmful particularly to vinyl coated glass yarn type screening.

Additionally, all of these devices involve multiple components or the assembly of different materials such that the manufacture of these products is relatively complicated and expensive.

Demand for an improved decorative safety attachment for enhancing the visiblity of screen doors and windows which avoids the disadvantages of the prior art devices has increased considerably in recent years with the proliferation in residential dwellings of the softer vinyl coated glass yarn type screening used in sliding patio doors, enclosed porches, and windows, replacing traditional, coarse, wire mesh screening. Screens are frequently damaged because their fine mesh creates the illusion of an open door. People often tend to mistake the screening for an open door, attempting to walk through the closed screen, thereby tearing the screen or otherwise damaging the screen door unit itself. Personal injury or other property damage may likewise result. These hazards particularly heighten the need for an effective visibility-enhancing safety device.

Accordingly, there remains a significant need for a visibility-enhancing and aesthetically pleasing safety device which can easily and conveniently be attached to and removed from most any type of door or window screen to improve overall visibility and decorative appeal. There also remains a significant need for a light-weight device that affords a one-side anchoring method for installation. There further remains a significant need for a simple and low cost safety device for enhancing the visibility of screen doors and windows which avoids the disadvantages of the prior art devices. There further remains a significant need to disguise minor wear and tears with a durable yet soft and pliable device that will not cause further damage to the screening.

SUMMARY OF THE INVENTION

It is, therefore, an object of the present invention to provide a decorative safety attachment for screen doors and windows to improve visibility and thereby prevent inadvertent walk-through, resultant injury, tearing of the screen, or damage to other components or property.

It is another object of the invention to provide an aesthetically-pleasing and visibility-enhancing device as described above which can be conveniently attached to and removed from screen doors or windows.

It is still another object of the invention to provide an aesthetically-pleasing and decorative device as described above which permits either a full or narrow use of the screening surface as desired, and permits greater or less artistic elaboration as desired.

It is still another object of the invention to provide a decorative safety attachment for screen doors and windows which conceals minor wear or tears in the screening.

It is still another object of the invention to provide a one-sided installation method for a decorative safety attachment for screen doors and windows.

It is still another object of the invention to provide a two-sided concentric attachment and installation method if preferred for a decorative safety attachment for screen doors and windows.

It is still another object of the invention to provide for removal of the device as described above without producing damage to the screening.

It is still another object of the invention to provide a visibility-enhancing three-dimensional raised device as described above for improved light reflection and visibility.

It is still another object of the invention to provide an improved decorative safety attachment for door and window screening which is light-weight, constructed of a light-weight material, and which contains a concave or hollowed underside to its visibility-enhancing three-dimensional member to further reduce its weight.

It is still another object of the invention to provide an improved decorative safety attachment for door and window screening containing holes, grooves, or perforations to minimize the impedance of air flow and accent various visibility-enhancing shapes.

It is still another object of the invention to provide a flat variation of the device as described above for conveying decal or imprinted text if desired.

It is still another object of the invention to provide an improved decorative safety attachment for door and window screening which is simple to manufacture and easy to use.

It is still another object of the invention to provide an improved decorative safety attachment for door and window screening which is suitable for use with either wire or vinyl coated glass yarn type screening.

It is still another object of the invention to provide an improved decorative safety attachment for door and window screening which is flexible in order to minimize the prospect of stretching the screening during use.

It is still another object of the invention to provide an improved decorative safety attachment for door and window screening having smooth surfaces to minimize undesired removal by mere abrasion or from play by small children.

It is still another object of the invention to provide an improved decorative safety attachment for door and window screening which is durable and weather-proof to accommodate outside use in a variety of climatic conditions.

In accordance with the above objects, a decorative safety attachment for enhancing the visibility of screen doors and windows is disclosed. The attachment device comprises a member having either a flat of three-dimensional visibility-enhancing front facade, and either a flat or a concave underside having a perimeter which is adapted to conform to a flat screen surface A plurality of attachment pins protrude from the underside for allowing removable attachment to screen mesh. Each of the attachment pins comprises a cylindrical base portion leading to a narrow grooved stem portion, and an enlarged head portion. In the embodiment which provides for a three-dimensional front facade and a concave underside, the pins are placed inside the perimeter of the device such that a two-sided concentric attachment to the screen is made possible if desired.

The attachment device is constructed of a suitable molded plastic material that is flexible, smooth-surfaced, durable, weather-proof, and it can be manufactured at nominal cost. The attachment device facade can be manufactured in any variety of shapes and sizes to permit artistic and decorative arrangement on the screen. The attachment device can be manufactured in any variety of colors, and especially white, to improve its visibility enhancing capability by contrasting against the color of the screening and its surrounding components.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

Figure 1:
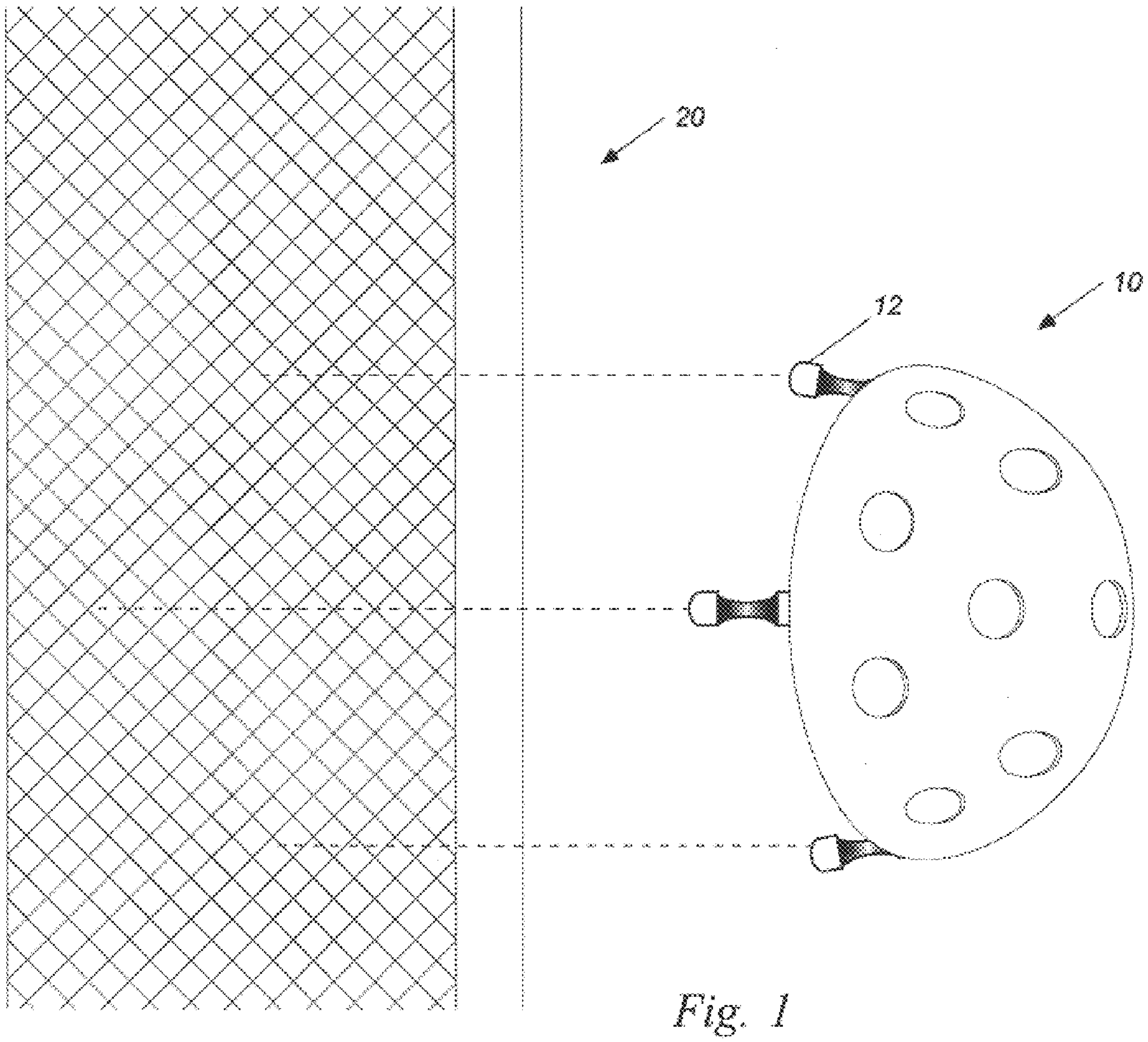
FIG. 1 is a perspective view of a decorative safety attachment 10 according to one embodiment of the present invention which provides enhanced visibility for screen doors and windows 20.

FIG. 1 is a perspective view of a decorative safety attachment 10 according to one embodiment of the present invention, the attachment 10 providing enhanced visibility for screen doors and windows 20.

The attachment 10 may be integrally molded of plastic or otherwise formed of a suitable lightweight yet durable material. The attachment 10 is formed with a visibility-enhancing front facade which is specifically designed and colored to compel notice by pedestrians. It should be understood that the front facade can be modified in shape, size and color to suit the preference of the individual without departing from the basic function of attracting attention. However, it has been found that a raised three-dimensional facade works best as it reflects light in all directions. In the illustrated embodiment, the attachment is provided with a raised half-spherical facade with a plurality of perforations to reduce weight and increase airflow. Additionally, a bright white front facade is best suited to compel notice on dark grey and charcoal colored screens.

The underside of the attachment is concave to further reduce the weight of the device. The perimeter of the underside is adapted to conform to the flat surface of a screen, and a plurality of attachment pins 12 protrude from the underside for allowing attachment to or removal from the mesh of a screen door (or window) 20. The pins are placed inside the perimeter of the attachment device so that a two-sided concentric installation may be achieved if desired.

Figure 2:
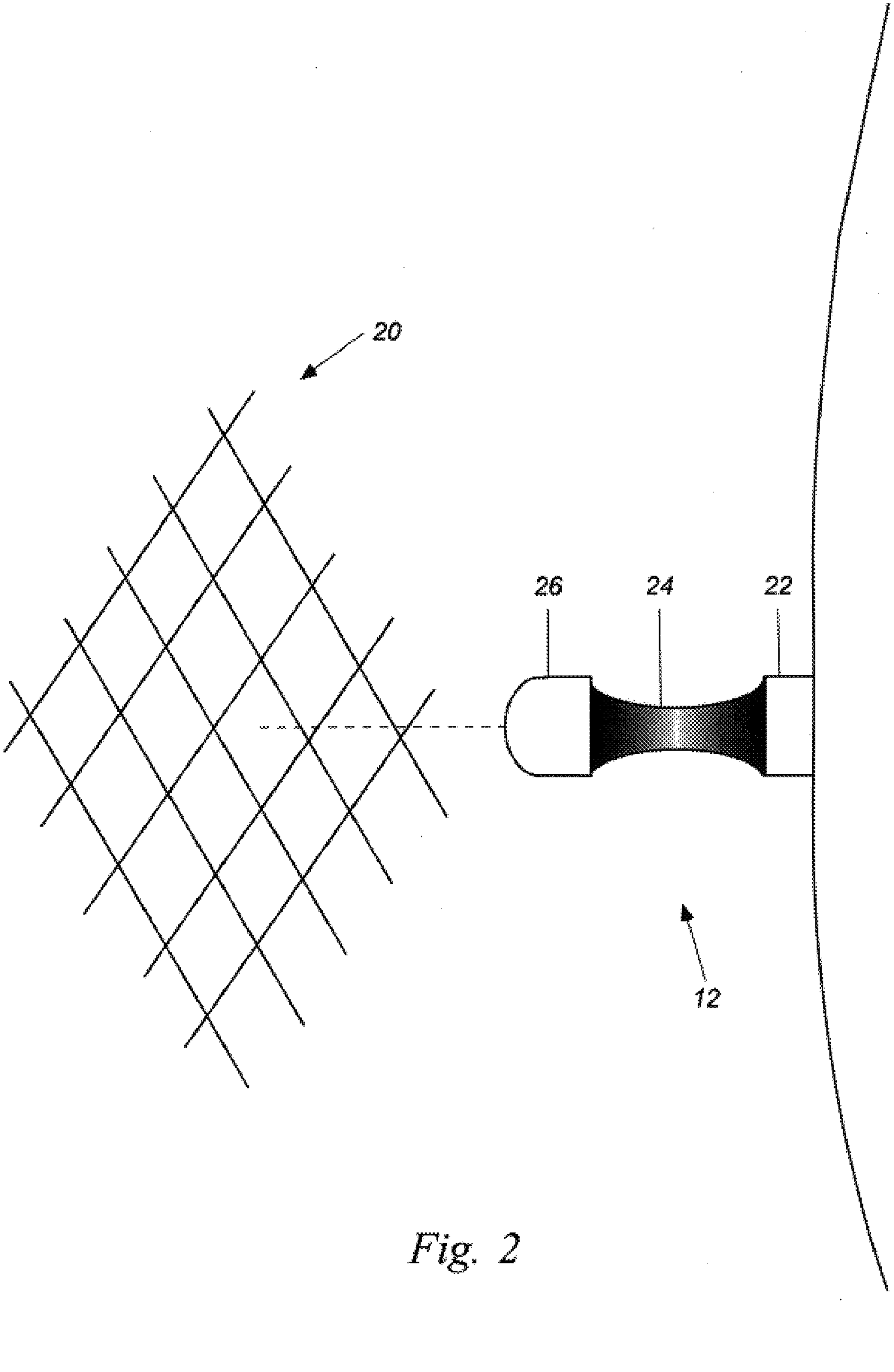
FIGS. 2–4 illustrate the insertion sequence of the attachment pin 12 of the present invention as it is progressively inserted through a screen 20.

FIG. 2 is an enlarged drawing of the attachment pin 12 of the present invention. Each pin 12 comprises a base portion 22 leading to a narrow grooved stem portion 24 and an enlarged rounded head portion 26. The head portion 26 essentially resembles the shape of a mushroom. For 18×16 mesh screening which is used in most residential applications, the grooved stem 24 is preferably approximately 0.025 inches in length and 0.045 inches in stem thickness. The head portion 26 is preferably approximately 0.055 inches in length and 0.055 inches in thickness at the widest point. These dimensions are essential to ensure that the attachments 10 will operate with the most common form of residential mesh screening. However, those dimensions may be varied as necessary in order to accommodate various other mesh configurations which may vary in screen wire or yarn diameters or other specifications.. The attachment pins 12 should be peripherally located on the underside of the attachment device to provide optimal stability.

Figure 3:
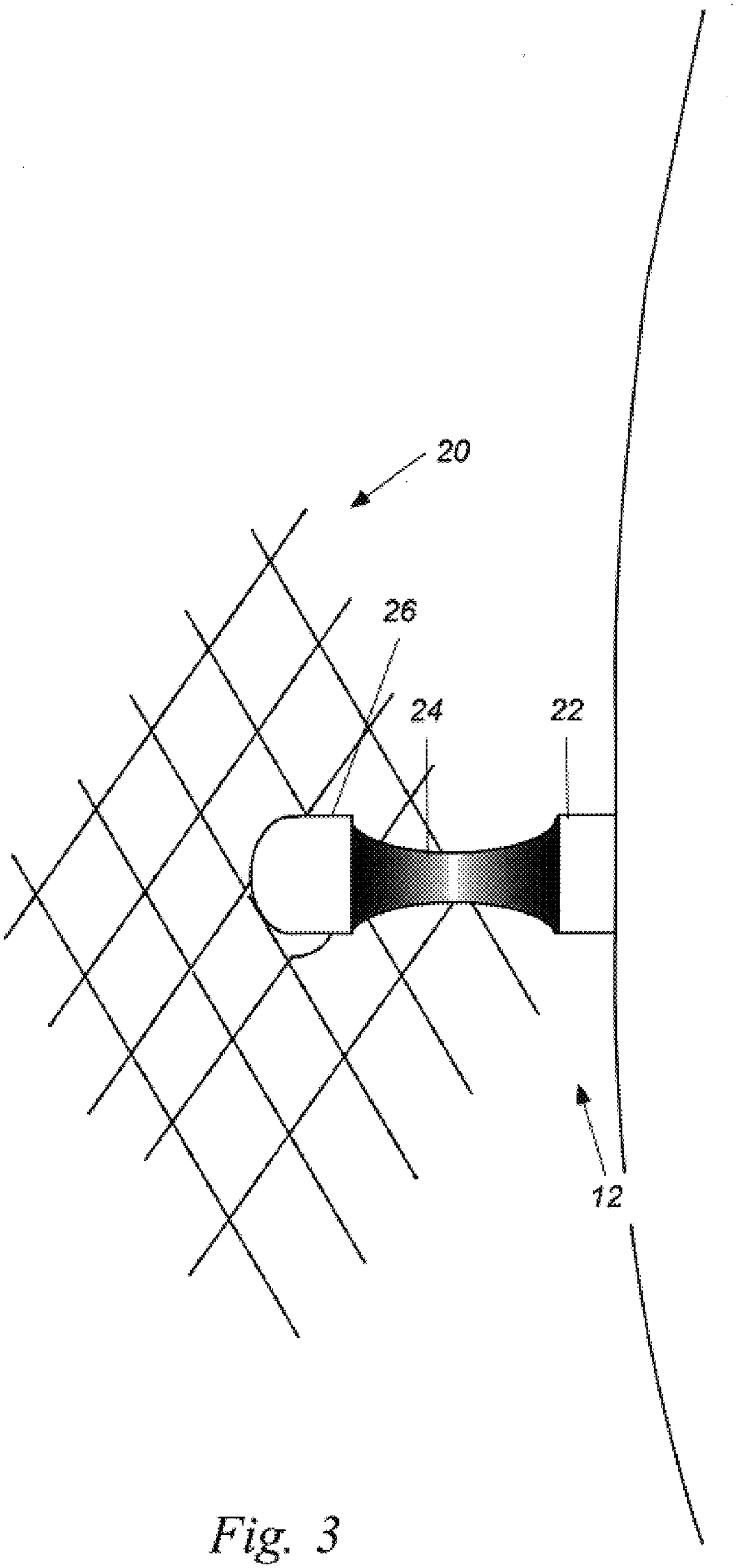
Figure 4:
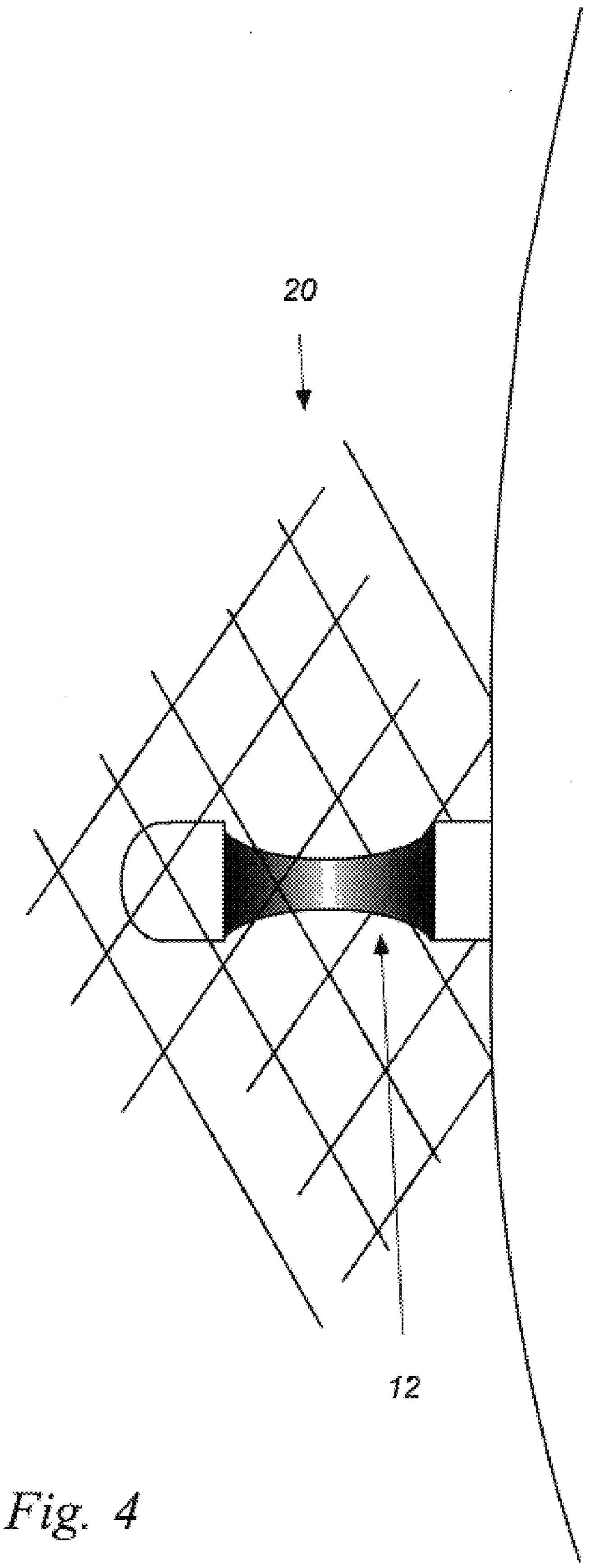

FIGS. 2–4 together illustrate the insertion sequence of the attachment pin 12 of the present invention as it is progressively inserted through screen 20.

As shown in FIG. 2, the wider head portion 26 of pin 12 is brought to bear against a substantially square shaped opening in the mesh 20.

Turning to FIG. 3, as the wider head portion 26 of pin 12 is pushed against the substantially square shaped opening in the mesh 20, the opening stretches slightly to let the head 26 pass through.

With reference to FIG. 4, the mesh 20 returns to its normal square configuration after the wider head portion 26 of pin 12 has been pushed completely through the square shaped opening. The square of mesh 20 closes around the stem 24 behind the wider head portion 26. The pin 12 is anchored firmly in position as the square of mesh 20 embraces the narrower stem 24 and holds the pin 12 thereby between the wider head portion 26 and base portion 22. The attachment 10 should be formed with at least two rearwardly-protruding pins 12 (and preferably three) to ensure that the attachment device is securely supported by the mesh 20.

Figure 5:
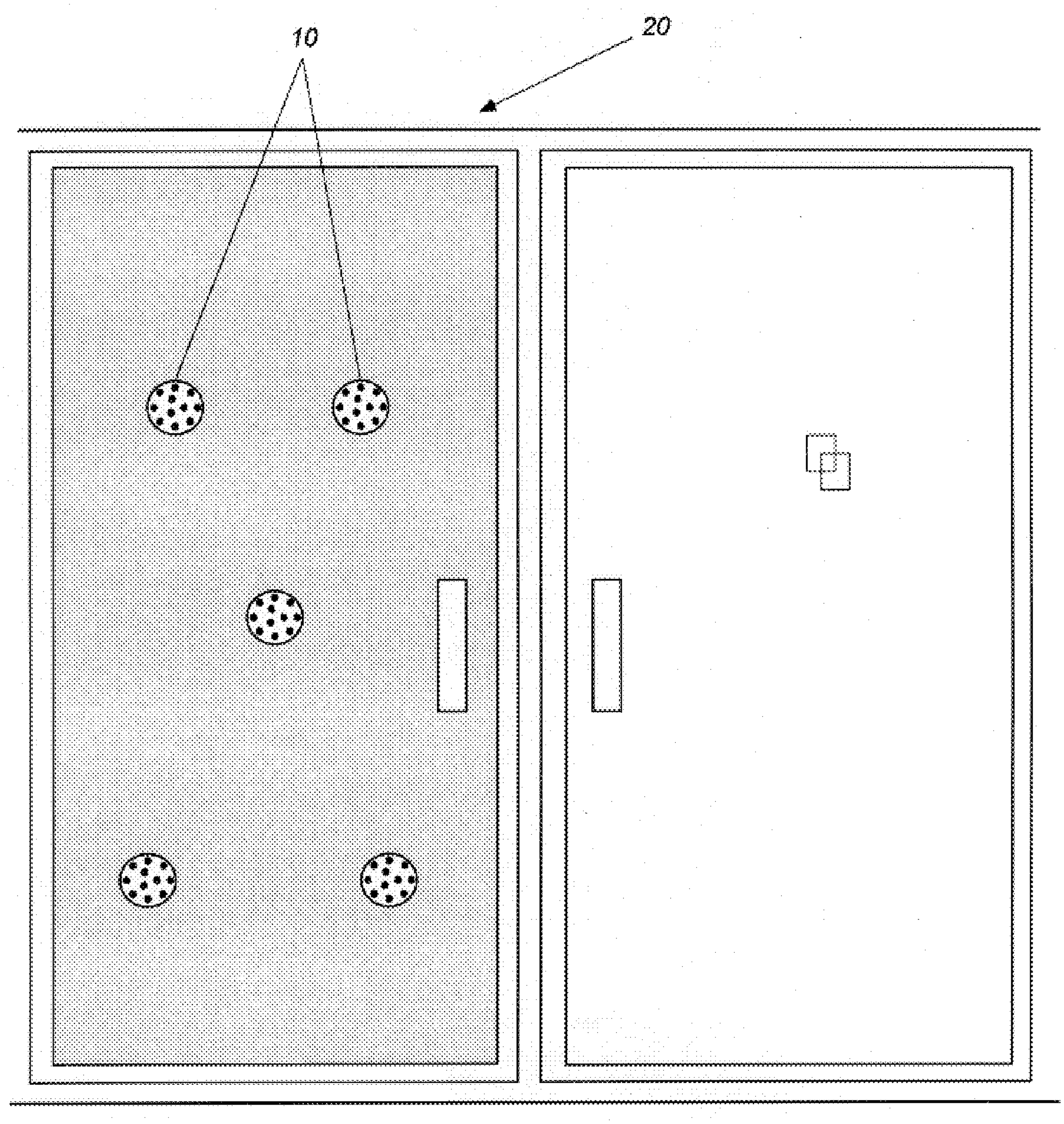
FIG. 5 is a perspective view of a screen door 20 with multiple decorative safety attachments 10 secured thereto.

FIG. 5 is a perspective view of a screen door 20 with multiple decorative safety attachments 10 secured thereto in the manner described above.

Figure 6:
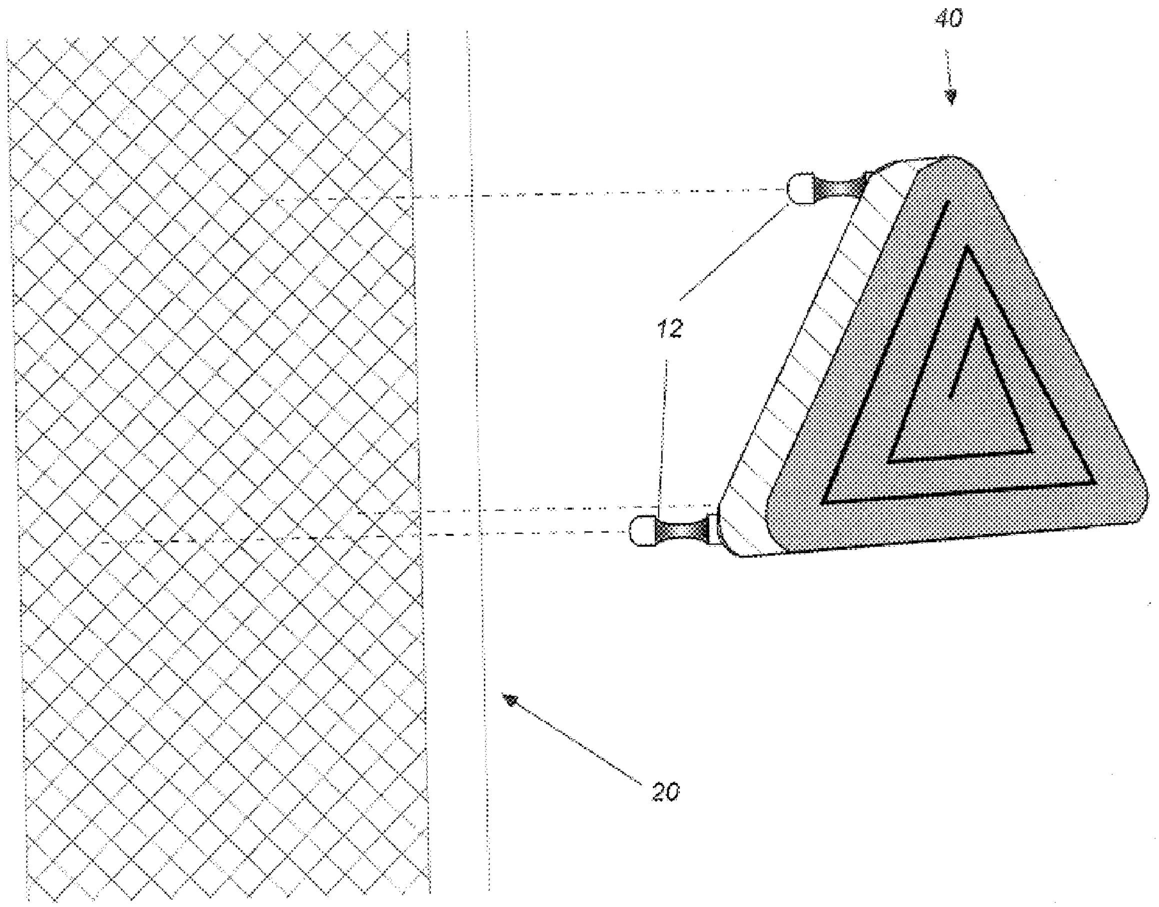
FIG. 6 is a perspective view of another embodiment of a decorative safety attachment 40 for screen doors and windows 20.

FIG. 6 is a perspective view of another embodiment of a decorative safety attachment 40 for screen doors and windows 20. This embodiment is substantially similar in most respects, but rather than a half-sphere as in FIG. 1, the front facade is triangular. The attachment pins 12 are peripherally located within the perimeter near the comers of the triangle so that a two-sided concentric installation is possible if desired.

Figure 7:
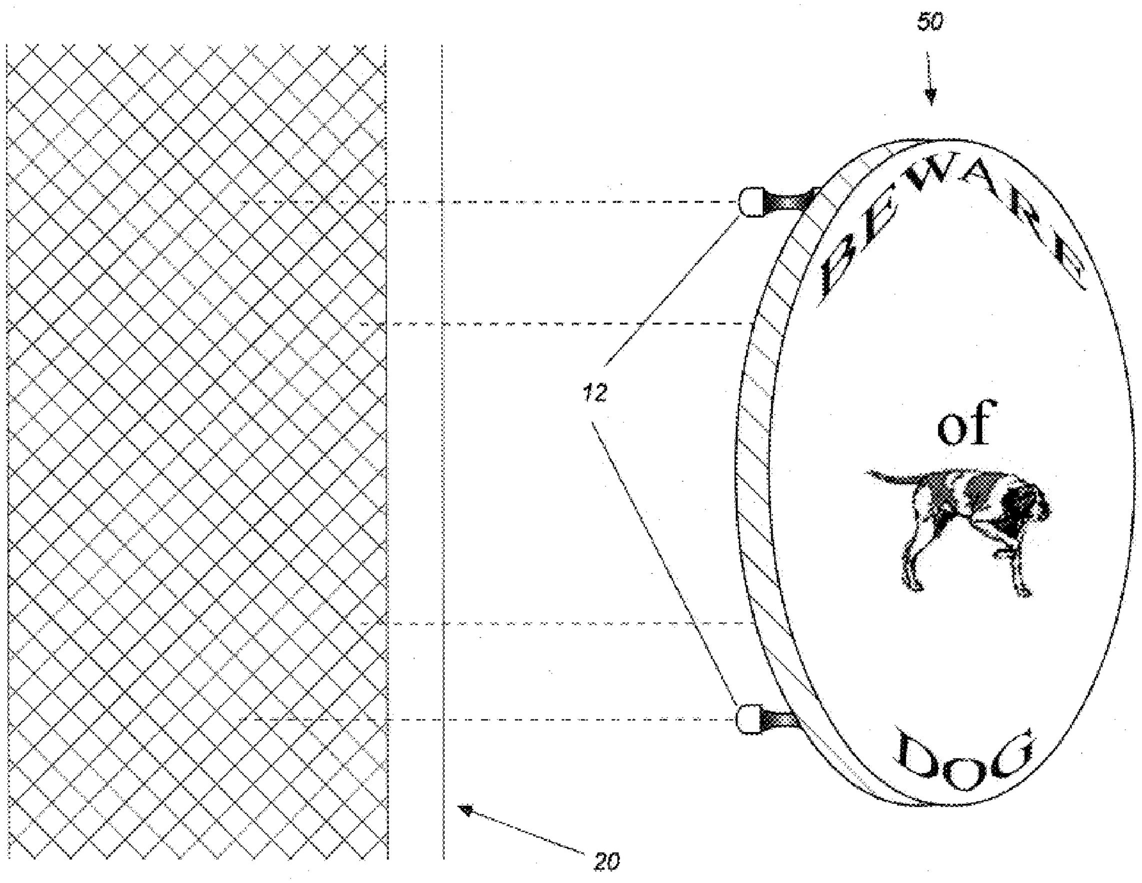
FIG. 7 is a perspective view of another embodiment of a decorative safety attachment 50 for screen doors and windows 20.

FIG. 7 is a perspective view of another embodiment of a decorative safety attachment 50 for screen doors and windows 20. The embodiment of FIG. 7 is again substantially similar to that of FIG. 1 in most respects, but rather than a half-sphere the front facade is essentially flat and outwardly adorned with artwork and text to improve the aesthetics. In a like manner, the attachments may alternatively serve as a medium for conveying other indicia, advertisements, or other promotional information.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein.

We claim:

1. A decorative safety attachment for enhancing visibility of door and window screening, comprising:

a visibility-enhancing front facade, said front facade being raised three-dimensional to reflect light in multiple directions;

an underside adapted to conform to a flat screen surface, said underside of the front facade being hollowed to reduce weight; and a plurality of attachment pins protruding from the underside for allowing attachment to one side of the mesh of a screen.

2. The decorative safety attachment for enhancing visibility of door and window screening according to claim 1, wherein said front facade is flat to accommodate decals, artwork, text, or other indicia.

3. The decorative safety attachment for enhancing visibility of door and window screening according to claim 1, wherein said front facade contains a plurality of perforations to reduce weight and increase airflow.

4. The decorative safety attachment for enhancing visibility of door and window screening according to claim 1, wherein said front facade is white to compel notice against dark grey and charcoal colored screening.

5. The decorative safety attachment for enhancing visibility of door and window screening according to claim 1, wherein said attachment pins are peripherally located on the underside.

6. The decorative safety attachment for enhancing visibility of door and window screening according to claim 1, wherein each of said attachment pins comprises a base portion leading to a narrow grooved stem portion, and an enlarged rounded head portion.

7. The decorative safety attachment for enhancing visibility of door and window screening according to claim 6, wherein said enlarged rounded head portion takes the shape of a mushroom.

8. The decorative safety attachment for enhancing visibility of door and window screening according to claim 6, wherein said stem is approximately 0.025 inches long and 0.045 inches thick, and the head portion is approximately 0.055 inches long and 0.055 inches thick at its widest point.

9. The decorative safety attachment for enhancing visibility of door and window screening according to claim 1, wherein an outermost edge of said front facade defines an outer perimeter, and the attachment pins are peripherally located inside of said outer perimeter.

10. A decorative safety attachment for enhancing visibility of door and window screening, comprising:

a visibility-enhancing front facade;

an underside adapted to conform to a flat screen surface; and a plurality of attachment pins protruding from the underside for allowing attachment to one side of the mesh of a screen, wherein each of said attachment pins comprises a base portion leading to a narrow grooved stem portion, and an enlarged rounded head portion.

11. The decorative safety attachment for enhancing visibility of door and window screening according to claim 10, wherein said enlarged rounded head portion takes the shape of a mushroom.

12. The decorative safety attachment for enhancing visibility of door and window screening according to claim 10, wherein said stem is approximately 0.025 inches long and 0.045 inches thick, and the head portion is approximately 0.055 inches long and 0.055 inches thick at its widest point.

13. The decorative safety attachment for enhancing visibility of door and window screening according to claim 10, wherein said front facade is flat to accommodate decals, artwork, text, or other indicia.

14. The decorative safety attachment for enhancing visibility of door and window screening according to claim 10, wherein said front facade is raised three-dimensional to reflect light in multiple directions.

15. The decorative safety attachment for enhancing visibility of door and window screening according to claim 10, wherein said front facade is white to compel notice against dark grey and charcoal colored screening.

16. The decorative safety attachment for enhancing visibility of door and window screening according to claim 10, wherein said attachment pins are peripherally located on the underside.

17. The decorative safety attachment for enhancing visibility of door and window screening according to claim 10, wherein an outermost edge of said front facade defines an outer perimeter, and the attachment pins are peripherally located inside of said outer perimeter.

18. A decorative safety attachment for enhancing visibility of door and window screening, comprising:

a visibility-enhancing front facade;

an underside adapted to conform to a flat screen surface, said underside having an outer perimeter defining a peripheral edge; and a plurality of attachment pins protruding from the underside for allowing one-sided attachment to one side of the mesh of a screen, said attachment pins being positioned immediately adjacent and generally perpendicular to said peripheral edge of said underside, wherein each of said attachment pins comprises a base portion leading to a narrow grooved stem portion, and an enlarged rounded head portion.

* * * * *